United States Patent [19]

Kirk

[11] 4,033,433

[45] July 5, 1977

[54] BODY MOTION BICYCLE SEAT BRAKE

[76] Inventor: Norbert A. Kirk, 2970 Sheridan Road, Chicago, Ill. 60657

[22] Filed: Oct. 18, 1976

[21] Appl. No.: 733,401

[52] U.S. Cl. .................................. 188/25; 188/29; 188/109

[51] Int. Cl.² .......................................... B62L 1/04

[58] Field of Search ............... 188/24, 27, 29, 109, 188/196 M, 250 G, 250 B, 25

[56] References Cited

UNITED STATES PATENTS

| 577,858 | 3/1897 | Hudson | 188/109 |
|---|---|---|---|
| 584,621 | 6/1897 | Borgfeldt | 188/109 |
| 588,270 | 8/1897 | Ecaubert | 188/109 |
| 605,735 | 6/1898 | Mayer | 188/109 |
| 633,266 | 9/1899 | Jamieson | 188/109 |
| 636,494 | 11/1899 | Collins | 188/109 |

Primary Examiner—Trygve M. Blix
Assistant Examiner—Douglas C. Butler

Attorney, Agent, or Firm—Larson, Taylor and Hinds

[57] ABSTRACT

A body motion actuated, bicycle seat brake comprises a seat resiliently mounted on the seat tube of a bicycle such that at least the forward end of the mounting member may be deflected downwardly by the action of a rider shifting his weight forwardly relative to the mounting member forward end. A brake member is pivotably mounted at one end thereof to the forward end of the mounting member and is slidably mounted at an intermediate location thereof to at least the seat tube of the bicycle such that the distal end of the brake member is disposed in spaced proximity to the rear wheel when the forward end of the mounting member is in an undeflected position, and is urged into abutting, braking relationship with the rear wheel when the forward end of the mounting member is deflected. The seat may also be slidably mounted on the resilient mounting member.

10 Claims, 5 Drawing Figures

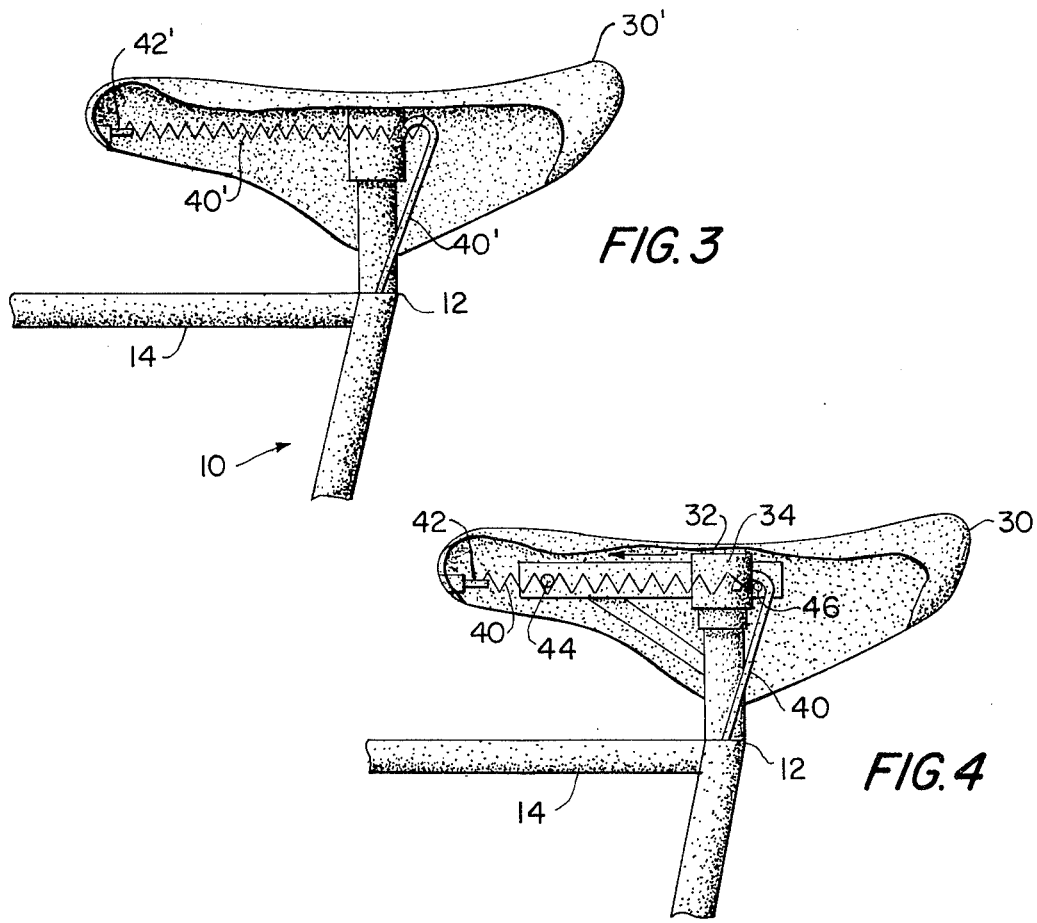
FIG. 3
FIG. 4
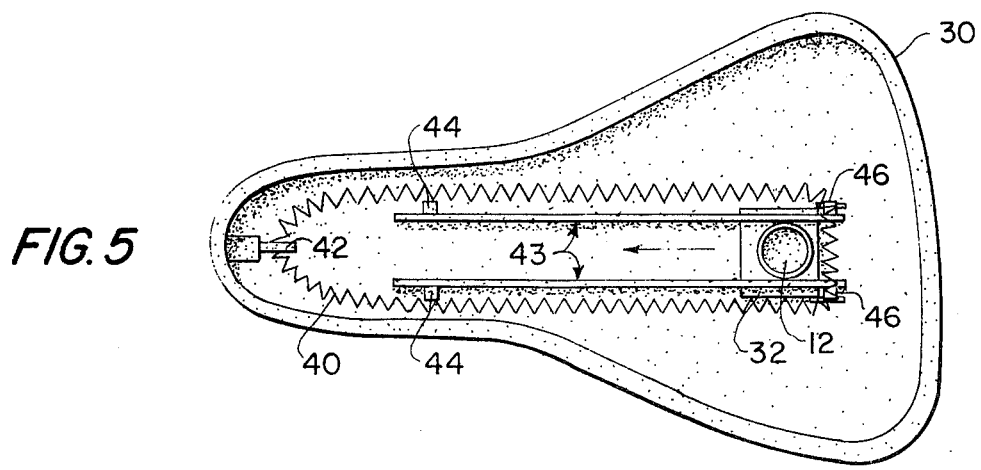
FIG. 5

BODY MOTION BICYCLE SEAT BRAKE

BACKGROUND OF THE INVENTION

1. Field of the Invention

The present invention relates generally to braking systems, and in particular to bicycle braking systems.

2. Description of the Prior Art

Conventional bicycles typically employ either hand-actuated caliper brakes, or foot-actuated coaster brakes. However, such braking systems suffer from a number of disadvantages. Both types are complex systems involving a large number of precision components which must be accurately adjusted to function properly. Both types of systems, and caliper brakes in particular, are subject to damage and wear. Further, even minor damage can cause serious malfunctions. Servicing also is difficult, particularly in the case of coaster brakes. Moreover, many individuals are unable to use caliper or coaster brake systems properly or effectively. In the case of caliper brakes, many people do not have large enough hands or a strong enough grip to safely reach and operate such brakes. In addition, caliper brakes often require a shifting of the position of the hands with respect to the handlebar in order to be operated, which can be a serious disadvantage in a panic situation or when riding over rough terrain, where a delay in applying the brakes or a loss of steering control can result in an accident even though the braking system is otherwise efficacious. In the case of coaster brakes, many individuals, and children in particular, ride bicycles which are too large and thus have difficulty reaching the pedals, which is critical to effective operation of coaster brakes. On the other hand, coaster brakes have a tendency to lock the rear wheel when applied, causing dangerous skids.

In order to overcome these disadvantages of caliper and coaster brake systems, efforts have been made to develop body motion-actuated seat brakes. Examples of such prior art devices are described in U.S. Pat. Nos. 577,858 (Hudson); 584,621 (Borgfeldt); 588,270 (Ecaubert); 605,735 (Mayer); and 633,266 (Jamieson). It is to be noted that the foregoing listing is merely illustrative, and is not, nor is it intended to be, exhaustive of the prior art. Notwithstanding their theoretical advantage over caliper and coaster brake systems, conventional body-motion seat brakes possess several disadvantages which limit their utility. A principal disadvantage is the fact that rearward movement of the rider is required to actuate the brake. As a result, the rider must overcome his forward inertia, which can be considerable in a severe braking situation, in order to maintain the braking action. Further, conventional body motion seat brakes employ seats which are pivotably mounted on a support member. Such an arrangement makes control of the braking force to be applied difficult, and adds to the complexity and weight of the brake, while introducing a source of malfunction and wear. Still further, prior art body-motion seat brakes are generally characterized by the number of different moving parts required.

SUMMARY OF THE INVENTION

These and other disadvantages of the prior art are overcome by a body-motion seat brake constructed according to the present invention, which comprises a seat, resilient means for mounting the seat on a bicycle seat tube such that the forward end of the mounting means may be deflected downwardly by the action of a rider shifting his weight forwardly, and an elongated brake member pivotably mounted at one end thereof to the forward end of the resilient mounting means, and mounted at an intermediate location thereof on the bicycle seat tube such that the distal end of the brake member is disposed in spaced proximity to the rear wheel of the bicycle when the forward end of the resilient mounting means is in a first undeflected position, and is disposed in abutting, braking relationship to the rear wheel when the forward end of the resilient mounting means is in a second deflected position as a result of the forward shift of the rider's weight. Preferably the brake member is mounted on the seat tube such that the brake member moves axially. Advantageously, a post mounted on the seat tube cooperating with an axially oriented, elongated slot in the brake member enables the brake member to move axially. Preferably, the brake member is also similarly mounted on the top tube of the bicycle.

In accordance with another aspect of the invention, the brake member either is bifurcated over at least a portion of its length to form first and second legs which straddle at least the seat tube, or comprises a single member which passes through an aperture provided in the seat tube.

A further important aspect of the present invention is the provision of means for slidably mounting the seat on the resilient mounting means, such that the seat may be displaced forwardly and rearwardly with respect to the forward end of the mounting means by the rider. Advantageously, the slidable seat mounting means comprises a pair of guide rails fixedly mounted on the resilient mounting means and a carriage having depending slide rails fixedly mounted on the seat.

Other features and advantages of the invention will be set forth in, or apparent from, the detailed description of the preferred embodiments found hereinbelow.

BRIEF DESCRIPTION OF THE DRAWINGS

FIG. 3 is a diagrammatic side elevational view, partially broken away, of a first seat mounting embodiment for a body motion bicycle seat brake constructed according to the present invention.

FIG. 4 is a diagrammatic side elevational view, partially broken away, of a second seat mounting embodiment for a body motion bicycle seat brake constructed according to the present invention.

FIG. 5 is a diagrammatic plan view, partially broken away, of the seat mounting embodiment illustrated in FIG. 4.

DETAILED DESCRIPTION OF THE PREFERRED EMBODIMENTS

Figure 1:
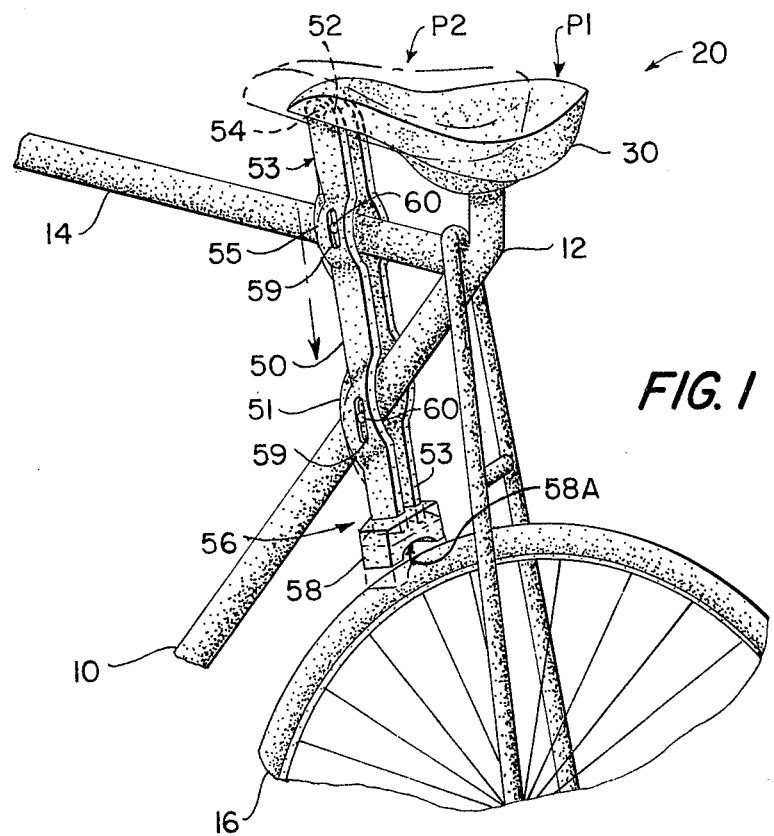
FIG. 1 is a perspective view of a first embodiment of a body motion bicycle seat brake constructed according to the present invention.

Referring to FIGS. 1, 4, and 5, a first embodiment of a body motion bicycle seat brake constructed according to the present invention comprises a seat 30, resilient means 40 for mounting seat 30 on the seat tube 12 of a bicycle, generally denoted 10, and an elongated brake member 50 which is pivotably mounted at end 52 thereof by any conventional means 54 to the forward end 42 of resilient means 40.

Referring specifically to FIGS. 4 and 5, a first embodiment of seat 30 is provided with a carriage 32 having depending sides which form slide rails 34. Resilient means 40 are provided with first and second spaced guide rails 43 which have stop members 44 and 46 projecting therefrom. Carriage 32 cooperates with guide rails 43 such that seat 30 is slidably mounted on resilient means 40 and may be displaced forwardly and rearwardly between two positions P1 and P2 by a shift of the rider's weight, as shown in solid and dashed lines, respectively, in FIG. 1. The forwardmost and rearwardmost displacement of seat 30 is restricted by the abutment of the correspondng ends of carriage slide rails 34 with stop members 44 and 46, respectively. Carriage 32 may also be biased, such as by a spring (not shown) to retard forward movement of seat 30 with a progressively increasing force as seat 30 is displaced forwardly.

With continuing reference to FIGS. 4 and 5, resilient means 40, which are shown diagrammatically, are so constructed and arranged that when seat 20 is in the rearwardmost, or P1 position, at least the forward end 42 of resilient means 40 is in a first, relatively undeflected, position; and when seat 20 is displaced forwardly toward the P2 position by the rider, at least the forward end 42 of resilient means 40 is deflected downwardly toward a second, relatively deflected, position.

Referring now to FIG. 1, end 56 of brake member 50 is provided with a brake shoe 58, and member 50 may be bifurcated for at least a portion thereof to form legs 53 which straddle top tube 14 and seat tube 12 of bicycle 10, as shown. The legs 53 may also be curved as shown to fit around top tube 14 and seat tube 12. Brake member 50 is mounted at an intermediate location 51 thereof on seat tube 12 such that with end 52 pivotably mounted to resilient means forward end 42, as described hereinabove, brake shoe 58 is disposed in spaced proximity to the rear wheel 16 of bicycle 10 when forward end 42 of resilient means 40 is in the first undeflected position, and brake 58 is urged into abutting, braking relationship with wheel 16 when forward end 42 of resilient means 40 is deflected toward the second, deflected, position as a result of forward displacement of seat 30 by the rider. Preferably, brake member 50 is mounted on seat tube 12 by means which enable axial movement of brake member 50, such as, for example, posts 60 which project from seat tube 12 and elongated, axially-oriented slots 50 in legs 58 which cooperate with posts 60, as shown. Advantageously, brake member 50 may also be similarly mounted at a second intermediate location 55 thereof on top tube 14, as shown. Further, brake shoe 58 may be provided with a braking surface 58A, which is contoured to fit the periphery of the tire portion of wheel 16, as shown.

Figure 2:
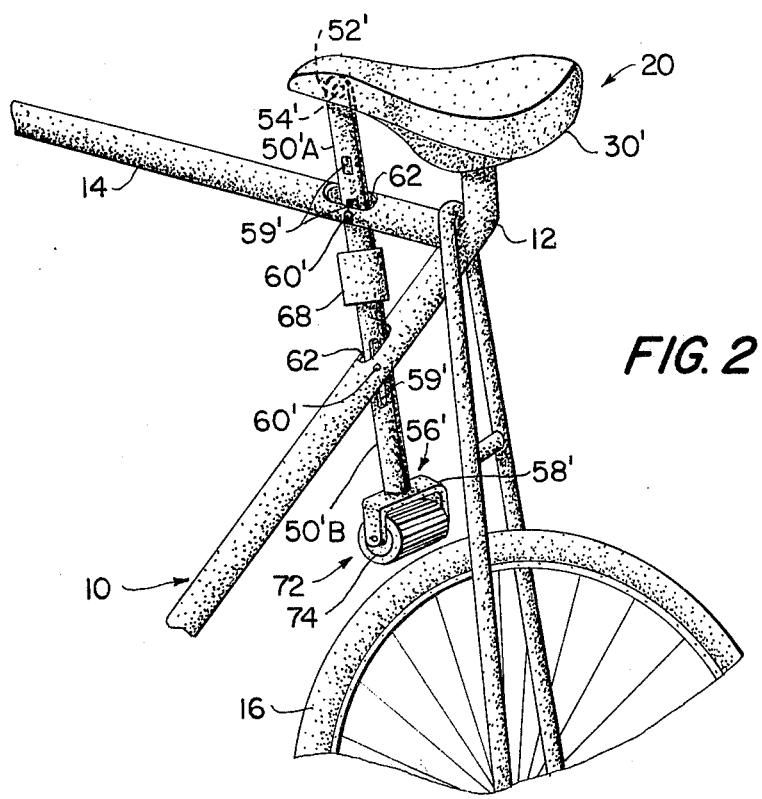
FIG. 2 is a perspective view of a second embodiment of a body motion bicycle seat brake constructed according to the present invention.

With reference to FIGS. 2 and 3, a second embodiment of a body motion bicycle seat brake constructed according to the present invention will now be described. The embodiment of FIGS. 2 and 3 includes elements similar to those of the embodiment of FIGS. 1, 4, and 5. These elements have been given the same reference numbers, with primes attached.

Unlike the seat embodiment illustrated in FIGS. 4 and 5, the seat 30', which is illustrated in FIG. 3, is fixedly mounted on resilient means 40' and is not capable of being displaced forwardly or rearwardly with respect thereto. However, the forward end 42' of resilient means 40' may still be deflected downwardly by action of the rider shifting his weight forwardly relative to forward end 42'. Referring specifically to FIG. 2, brake member 50' is not bifurcated and may either be curved (not shown) to fit around top tube 14 and seat tube 12, or may be substantially straight as shown and pass through apertures 62 which are provided in top tube 14 and seat tube 12. Brake member 50' may also be provided with axially-oriented slots 50' which cooperate with posts 60', which are transversely disposed within apertures 62, as shown. Brake member 50' may also comprise two telescoping sections 50'A and 50'B connected by clamp means 68 such that the overall length of brake member 50 may be adjusted in order to accommodate differing frame sizes and seat heights. Section 59'A is provided with a plurality of slots 59' so that brake member 50' may be mounted on top tube 14 in the manner described hereinabove for various lengths of member 50'. Brake shoe 58' comprises a rotating cylinder 72 which is provided with an adjustable brake or drag 74 whereby the resistance to rotation of cylinder 72 and thus the braking efficiency of brake shoe 58', may be regulated.

The operation of either seat brake embodiment described hereinabove should be apparent from the foregoing description. In the case of the seat brake embodiment illustrated in FIG. 1, a forward shift in the rider's weight causes seat 30 to slide forward relative to the forward end 42 of resilient means 40. The resulting shift in the position of the weight being supported by resilient means 40 causes at least forward end 42 thereof to be deflected downwardly. The degree of downward deflection and hence the degree of braking is dependent on how far forward seat 30 is displaced. The downward deflection of forward end 42 of resilient means 40 causes brake member 50 to be displaced axially such that brake shoe 58 is urged into abutting, braking relationship with the tire portion of wheel 16.

The operation of the seat brake embodiment illustrated in FIG. 2 is similar to that of the embodiment illustrated in FIG. 1, except that seat 30' is not displaced forwardly by a forward shift in the rider's weight. Instead, downward deflection of forward end 42' of resilient means 40 is accomplished by shifting the rider's center of gravity forward relative to seat 30' such as, for example, moving the rider's torso forward.

A body motion seat brake constructed according to the present invention thus provides an effective braking system which employs a minimum number of parts, requires a minimum effort to activate, and combines maximum braking effect with maximum control by the rider. On the one hand, the rider may take advantage of his forward inertia and the leverage supplied by the braking system to achieve maximum stopping effect. On the other hand, the rider may easily regulate the amount of braking force applied simply by limiting the extent to which his weight is shifted forward relative to the forward end of the resilient mounting means.

It will be appreciated by those skilled in the art that although the invention has been described relative to exemplary embodiments thereof, modifications and variations can be effected in these embodiments without departing from the scope and spirit of the invention.

In particular, it is to be noted that any embodiment of the brake member may be used with any seat mounting embodiment described hereinabove.

I claim:
1. In a bicycle having a frame which includes a seat tube, and a rear wheel mounted in the frame, a body motion seat brake system comprising a seat, resilient means for mounting said seat on the seat tube such that at least the forward end of said resilient means may be deflected downwardly by the action of a rider shifting his weight forwardly relative to said forward end, and an elongated brake member having means for pivotably mounting one end thereof to said forward end of said resilient means and for mounting said brake member at an intermediate location thereof on the seat tube, such that the distal end of said brake member is disposed in spaced proximity to the rear wheel when said forward end of said resilient means is in a relatively undeflected position and is urged into abutting, braking relationship with the rear wheel when said forward end of said resilient means is deflected as a result of a forward shift of the rider's weight.

2. The brake system of claim 1 further comprising means for slidably mounting said seat on said resilient mounting means such that said seat may be displaced forwardly and rearwardly relative to said forward end of said mounting means by a rider.

3. The brake system of claim 2 wherein said means for slidably mounting said seat comprises first and second spaced guide rails fixedly mounted on said resilient mounting means, and a carriage fixedly mounted on said seat and having depending first and second spaced slide rails adapted to cooperate with the corresponding guide rails such that said carriage is slidably mounted on said guide rails.

4. The brake system of claim 1 wherin said brake member mounting means comprises means for enabling axial movement of said brake member.

5. The brake system of claim 4 wherein said axial movement means comprises at least one post member mounted on the seat tube, and at least one axially-oriented, elongated slot in said brake member cooperating with said at least one post member.

6. The brake system of claim 4 wherein the bicycle further has a top tube, and said brake system further comprises means for slidably mounting said brake member at a second intermediate location thereof on the top tube such that said brake member may be displaced axially.

7. The brake system of claim 4 wherein the seat tube is provided with an aperture and said brake member passes therethrough.

8. The brake system of claim 7 wherein the seat tube is provided with at least one post member transversely oriented with said aperture and said brake member is provided with at least one axially-oriented, elongated, slot which cooperates with said at least one post member.

9. The brake system of claim 1 wherein at least a portion of said brake member is bifurcated to form first and second legs which straddle the seat tube.

10. The brake system of claim 1 wherein said distal end of said brake member is provided with a brake pad having a tire-engaging surface which is contoured to fit the peripheral surface of the rear wheel.

* * * * *